(12) United States Patent
Arntz et al.

(10) Patent No.: US 7,041,725 B2
(45) Date of Patent: May 9, 2006

(54) MODIFIED POLYURETHANES, A PROCESS FOR THEIR PREPARATION, AND ELECTROPLATED OR METALLIZED MOLDED ARTICLES PRODUCED THEREFROM

(75) Inventors: Hans-Detlef Arntz, Lohmar (DE); Eduard Mayer, Dormagen (DE); Helmut Meyer, Odenthal (DE)

(73) Assignee: Bayer Aktiengesellschaft, Leverkusen (DE)

( * ) Notice: Subject to any disclaimer, the term of this patent is extended or adjusted under 35 U.S.C. 154(b) by 97 days.

(21) Appl. No.: 10/417,034

(22) Filed: Apr. 16, 2003

(65) Prior Publication Data

US 2003/0204016 A1    Oct. 30, 2003

(30) Foreign Application Priority Data

Apr. 26, 2002  (DE) ............................ 102 18 594

(51) Int. Cl.
*C08J 3/00* (2006.01)
*C08K 3/20* (2006.01)
*C08K 3/26* (2006.01)
*C08L 75/00* (2006.01)
*C08G 63/48* (2006.01)

(52) U.S. Cl. .................... 524/507; 524/27; 524/56; 524/425; 524/589; 524/590; 525/66; 525/123

(58) Field of Classification Search ........... 524/507, 524/425, 590, 589, 27, 56; 525/123, 66
See application file for complete search history.

(56) References Cited

U.S. PATENT DOCUMENTS 5,179,146 A    1/1993  Müller et al. ............... 524/197
5,216,062 A    6/1993  Lausberg et al. ........... 524/404

FOREIGN PATENT DOCUMENTS

DE    195 17 338    11/1995
EP    0 568 388      11/1993

OTHER PUBLICATIONS

English Abstract of JP 363109193A, Tochitani et al., May 1988.*
Database WPI, Week 199512, Apr. 21, 1995, Derwent Publications Ltd., London, GB; AN 1995-088257, XP002246979 & RU 2 015 145 C (NII Elecktronnykh Materialov), Jun. 30, 1994 Zusammenfassung.

* cited by examiner

*Primary Examiner*—Patrick D. Niland
(74) *Attorney, Agent, or Firm*—Joseph C. Gil; Lyndanne M. Whalen

(57) ABSTRACT

Modified polyurethanes based on polyurethane reactive systems composed of at least one organic polyisocyanate and a polyol formulation, which additionally contains at least one polymer modifier and at least one filler are prepared. These modified polyurethanes are useful in the production of electroplated/metallized molded articles.

4 Claims, No Drawings

MODIFIED POLYURETHANES, A PROCESS FOR THEIR PREPARATION, AND ELECTROPLATED OR METALLIZED MOLDED ARTICLES PRODUCED THEREFROM

BACKGROUND OF THE INVENTION

The invention relates to modified polyurethanes (PU) based on polyurethane reactive systems composed of organic polyisocyanates and polyol formulations, which additionally contain polymer modifiers and fillers, to a process for their preparation, and to their use in electroplating or metallization.

The production of polyurethane molded bodies has long been known (e.g. from Polyurethane Kunststoffhandbuch 7, Carl Hanser Verlag Munich-Vienna 1983).

In DE-A 4 110 976, polyisocyanates modified with so-called polymer modifiers are used for the production of PU molded bodies.

The plastics provided with electrodeposited metal layers have hitherto been acrylonitrile-butadiene-styrene copolymers (ABS) (Ullmann's Encyclopedia of Industrial Chemistry). Moldings are produced from the mentioned ABS copolymers by the thermoplastic injection molding process and are subsequently coated with a metal surface by electroplating processes. Such coated moldings are used in the sanitary field, for example as fittings, handles and towel-rails, or in the automotive sector, for example as decorative elements (lettering, Mercedes star) and radiator grills, etc. Although polyurethane molded bodies are also coated in that manner, the adhesion of the metal layer to the PU (polyurethane) is very poor (Metallisieren von Kunststoffgehausen unter EMV-, Umwelt-und Recyclingaspekten, 1st edition 1998, by Prof. Dr.-Ing. Ernst Habinger, Dr.-Ing. Autor Singh Sidhu, Leuze-Verlag).

DE-A 195 17 338 describes the production of a composite product which is molded from plastics and is provided with a selective metal coating. The product is composed of at least two parts made from different polymers, one part being a coatable plastics material and a second part being a non-coatable plastics material. The second part is molded over the first part in a manner such that an area of the first part is not covered. A metal coating is then applied to the uncovered area of the first part. Polyurethane is mentioned as a non-coatable plastics material, while an ABS/PC plastics material is described as a coatable plastics material.

SUMMARY OF THE INVENTION

The object of the present invention was to provide modified polyurethanes which can be electroplated, or metallized, in a simple manner and which exhibit good adhesion of the applied metal layer.

It has been possible to achieve the object using modified polyurethanes. Surprisingly, it has been found that, as a result of using even small amounts of ABS in the polyurethanes, preferably in combination with organic or inorganic fillers which are soluble in the pickling solutions used in the electroplating of plastics, the polyurethanes so modified, or the molded bodies produced therefrom, can be metallized/electroplated and the metal layers exhibit good adhesion to the modified polyurethane.

DETAILED DESCRIPTION OF THE INVENTION

The invention provides modified polyurethanes composed of i) at least one polyurethane obtainable from an organic polyisocyanate, at least one polyol and, optionally, a chain extender and/or crosslinker, ii) at least one polymer modifier composed of at least one swellable graft rubber of particulate structure which is dispersible in organic polyisocyanates and includes from 20 to 80 wt. % of a rubber polymer having a glass transition temperature below 0° C. and the remainder a grafted-on vinyl monomer and/or acrylic monomer, iii) at least one filler which is soluble in pickling solutions used in the electroplating of plastics and has a mean particle size of from 0.02 to 0.5 μm and a bulk density of from 170 to 500 kg/m$^3$, and iv) optionally further conventional catalysts, auxiliaries and additives.

The polyurethanes useful as component i) are both thermoplastically processable polyurethanes and polyurethanes which can be processed to form moldings by the RIM process (reaction injection molding process) or by the casting process.

The invention also provides a process for the preparation of the modified polyurethanes of the present invention in which a) a polyisocyanate component composed of a1) at least one optionally modified organic polyisocyanate having an NCO content of from 5 to 50 wt. %, preferably from 15 to 48 wt. %, a2) optionally, conventional auxiliary substances and additives, is reacted, optionally in the presence of a catalyst, with b) a polyol component composed of b1) at least one component which is a long-chain polyether, polyether amine and/or polyester having an OH functionality of from 2 to 6 and a number-average molecular weight of from 1000 to 12,000 g/mol (daltons), b2) optionally, at least one short-chain polyol and/or polyamine having an OH or NH functionality of from 2 to 6 and a molecular weight of from 60 to 600, and b3) optionally, further auxiliary substances and additives, with the addition of c) at least one polymer modifier composed of at least one swellable graft rubber of particulate structure which is dispersible in component a1) and includes from 20 to 80 wt. % of a rubber polymer having a glass transition temperature below 0° C. and the remainder a grafted-on vinyl monomer and/or acrylic monomer, and d) at least one filler which is soluble in a pickling solution used in the electroplating of plastics and has a mean particle size of from 0.02 to 0.5 μm and a bulk density of from 170 to 500 kg/m$^3$.

The modified polyurethanes of the present invention are used as the base material in the electroplating/metallization of the PU molded bodies produced therefrom. Metallized PU molded bodies with a metal coating exhibiting very good adhesion to the plastics base are obtained.

The modified polyurethanes according to the invention are preferably prepared as follows:

I) Preferred preparation variants for the polyisocyanate component a) that is used, which at the same time also contains the polymer modifier c):

A) the polymer modifier c) is preferably dispersed in the polyisocyanate a1); or
B) the polymer modifier c) is preferably dispersed in the polyisocyanate a), and the mixture is subsequently reacted with a portion of the polyol b) to form an NCO prepolymer; or
C) an NCO prepolymer is preferably prepared from a portion of the polyol b) and the polyisocyanate a), and the polymer modifier c) is subsequently dispersed therein; or
D) an NCO prepolymer is preferably prepared by simultaneously mixing the polymer modifier c), a portion of the polyol b) and the polyisocyanate a).

The above-mentioned variants A) to D) are usually carried out at from room temperature to 120° C., preferably from 40 to 90° C., most preferably from 65 to 85° C., until the NCO value to be expected is achieved. If aliphatic polyisocyanates are used, the particularly preferred temperature range is from 80 to 120° C.

The isocyanate components modified in accordance with any of process variants A) to D) are subsequently reacted with any remaining polyol component b) by the reaction casting or reaction injection molding processes conventional in polyurethanes technology.

The filler d) is preferably mixed with the polyol component b).

Suitable starting components a1) for the process according to the invention and for the polyurethanes according to the invention are aliphatic, cycloaliphatic, araliphatic, aromatic and heterocyclic polyisocyanates, as are described, for example, by W. Siefken in Justus Liebigs Annalen der Chemie, 562, pages 75 to 136, for example, those of the formula

in which n=from 2 to 4 and Q represents an aliphatic hydrocarbon radical having from 2 to 18 carbon atoms (preferably from 6 to 10 carbon atoms), a cycloaliphatic hydrocarbon radical having from 4 to 15 carbon atoms (preferably from 5 to 10 carbon atoms), an aromatic hydrocarbon radical having from 6 to 15 carbon atoms (preferably from 6 to 13 carbon atoms), or an araliphatic hydrocarbon radical having from 8 to 15 carbon atoms (preferably from 8 to 13 carbon atoms). Specific examples of such polyisocyanates include: ethylene diisocyanate, 1,4-tetramethylene diisocyanate, 1,6-hexamethylene diisocyanate (HDI), 1,12-dodecane diisocyanate, cyclobutane-1,3-diisocyanate, cyclohexane-1,3- and -1,4-diisocyanate and any desired mixtures of those isomers, 1-isocyanato-3,3,5-trimethyl-5-isocyanatomethyl-cyclohexane, 2,4- and 2,6-hexa-hydro-toluene diisocyanate and any desired mixtures of those isomers, hexahydro-1,3- and -1,4-phenylene diisocyanate, perhydro-2,4'- and -4,4'-diphenylmethane diisocyanate, 1,3- and 1,4-phenylene diisocyanate, 1,4-durene diisocyanate (DDI), 4,4'-stilbene diisocyanate, 3,3'-dimethyl-4,4'-biphenylene diisocyanate (TODI), 2,4- and 2,6-toluene diisocyanate (TDI) and any desired mixtures of those isomers, diphenylmethane-2,4'- and/or -4,4'-diisocyanate (MDI), or naphthylene-1,5-diisocyanate (NDI).

Also suitable are, for example: triphenylmethane-4,4'-4"-triisocyanate; polyphenyl-polymethylene polyisocyanates such as those obtained by aniline-formaldehyde condensation and subsequent phosgenation and described, for example, in GB-PS 874 430 and GB-PS 848 671; m- and p-isocyanatophenyl-sulfonyl isocyanates according to U.S. Pat. No. 3,454,606; perchlorinated aryl polyisocyanates, as are described in U.S. Pat. No. 3,277,138; polyisocyanates having carbodiimide groups such as those described in U.S. Pat. No. 3,152,162 and in DE-OS 25 04 400, 25 37 685 and 25 52 350; norbornane diisocyanates according to U.S. Pat. No. 3,492,301; polyisocyanates having allophanate groups, as are described in GB 994,890, BE-PS 761 626 and NL-A 7 102 524; polyisocyanates having isocyanurate groups, as are described in U.S. Pat. No. 3,001,9731, in DE-PS 10 22 789, 12 22 067 and 1 027 394 and in DE-OS 1 929 034 and 2 004 048; polyisocyanates having urethane groups, as are described, for example, in BE-PS 752 261 or in U.S. Pat. Nos. 3,394,164 and 3,644,457; polyisocyanates having acylated urea groups according to DE-PS 1 230 778; polyisocyanates having biuret groups, as are described in U.S. Pat. Nos. 3,124,605; 3,201,372 and 3,124,605 and in GB-PS 889 050; polyisocyanates prepared by telomerization reactions, as are described in U.S. Pat. No. 3,654,106; polyisocyanates having ester groups, as are mentioned in GB-PS 965 474 and 1 072 956, in U.S. Pat. No. 3,567,763 and in DE-PS 12 31 688; reaction products of the above-mentioned isocyanates with acetals according to DE-PS 1 072 385; and polyisocyanates containing polymeric fatty acid esters according to U.S. Pat. No. 3,455,883.

It is also possible to use the isocyanate-group-containing distillation residues obtained in the industrial production of isocyanates, optionally dissolved in one or more of the above-mentioned polyisocyanates. It is also possible to use any desired mixtures of the above-mentioned polyisocyanates.

Preference is given to the use of the polyisocyanates that are readily obtainable industrially, for example 2,4- and 2,6-toluene diisocyanate and any desired mixtures of those isomers ("TDI"), 4,4'-diphenylmethane diisocyanate, 2,4'-di-phenylmethane diisocyanate, 2,2'-diphenylmethane diisocyanate and polyphenyl-polymethylene polyisocyanates, as are obtained by aniline-formaldehyde condensation and subsequent phosgenation ("crude MDI"), and polyisocyanates having carbodiimide groups, uretonimine groups, urethane groups, allophanate groups, isocyanurate groups, urea groups or biuret groups ("modified polyisocyanates"), especially those modified polyisocyanates which are derived from 2,4- and/or 2,6-toluene diisocyanate or from 4,4'- and/or 2,4'-diphenylmethane diisocyanate. Naphthylene-1,5-diisocyanate and mixtures of the mentioned polyisocyanates are also very suitable.

However, there are particularly preferably used in the process according to the invention modified polyisocyanates and prepolymers having isocyanate groups, with an NCO content of from 5 to 50 wt. %, preferably from 15 to 48 wt. %, most preferably from 15 to 25 wt. %.

Prepolymers having isocyanate groups can be prepared in the presence of a catalyst. However, it is also possible to prepare such prepolymers having isocyanate groups in the absence of a catalyst and to incorporate the catalyst(s) into the reaction mixture only for the production of the PU moldings.

Suitable long-chain polyethers b1) include polyether polyols, polyether ester polyols and polyester polyols. Polyether polyols can be prepared by known processes, for example by anionic polymerization of alkylene oxides in the presence of an alkali hydroxide or alkali alcoholate as catalyst and with the addition of at least one starter molecule that contains from 2 to 6 reactive hydrogen atoms bonded therein, or by cationic polymerization of alkylene oxides in the presence of a Lewis acid such as antimony pentachloride or boron fluoride etherate. The double-metal cyanide catalyzed alkoxylation process, which is described in the examples and teaching of U.S. Pat. Nos. 5,470,813 and 5,482,908, is also suitable.

Suitable alkylene oxides contain from 2 to 4 carbon atoms in the alkylene radical. Examples of suitable alkylene oxides are tetrahydrofuran, 1,2-propylene oxide, 1,2- and 2,3-butylene oxide, with preference being given to the use of ethylene oxide and/or 1,2-propylene oxide. The alkylene oxides can be used individually, alternately in succession, or in the form of mixtures. Mixtures of 1,2-propylene oxide and ethylene oxide are preferably used, with the ethylene oxide being used in amounts of from 10 to 50% in the form of an ethylene oxide end block ("EO-cap"), so that the resulting polyols contain over 70% primary OH end groups. Suitable starter molecules include: water and/or di- and hexa-hydric alcohols, such as ethylene glycol, 1,2-propanediol and 1,3-propanediol, diethylene glycol, dipropylene glycol, 1,4-ethanediol, glycerol, trimethylolpropane, sorbitol, glucose, etc. Suitable polyether polyols, preferably polyoxypropylene-polyoxyethylene polyols, have a functionality of from 2 to 6 and number-average molecular weights of from 500 to 18,000, preferably from 800 to 12,000.

Suitable polyether polyols also include polymer-modified polyether polyols, preferably graft polyether polyols, especially those based on styrene and/or acrylonitrile, which are prepared by in situ polymerization of acrylonitrile, styrene or, preferably, mixtures of styrene and acrylonitrile, for example in a weight ratio of from 90:10 to 10:90, preferably from 70:30 to 30:70, in the above-mentioned polyether polyols, as well as polyether polyol dispersions which contain as the disperse phase, usually in an amount of from 1 to 50 wt. %, preferably from 2 to 25 wt. % one or more materials such as an inorganic fillers, a polyurea, a polyhydrazide, a polyurethane containing tert-amino groups bonded therein, and/or melamine.

It is also possible to use the aminopolyethers which meet the specifications and are known per se from polyurethane chemistry, such as those which are described in the examples and teaching of EP 0 219 035 and EP 0 335 274.

Polyether ester polyols may also be used as polyol component b). They are obtained by propoxylation or ethoxylation of polyester polyols, preferably having a functionality of from 1 to 6, especially from 1.8 to 2.4, and a number-average molecular weight of from 400 to 8000, preferably from 800 to 4500.

It is also possible to use polyether ester polyols which are obtained by esterification of polyether polyols with the organic dicarboxylic acids listed below and alcohols having a functionality of two or more. Such polyether ester polyols preferably have a functionality of from 2 to 6 and a number-average molecular weight of from 400 to 8000, preferably from 800 to 4500 daltons.

Suitable polyester polyols can be prepared, for example, from organic dicarboxylic acids having from 2 to 12 carbon atoms, preferably aliphatic dicarboxylic acids having from 4 to 6 carbon atoms, and polyhydric alcohols, preferably diols, having from 2 to 12 carbon atoms, preferably from 2 to 6 carbon atoms. Examples of suitable dicarboxylic acids are: succinic acid, malonic acid, glutaric acid, adipic acid, suberic acid, azelaic acid, sebacic acid, decanedicarboxylic acid, maleic acid, fumaric acid, phthalic acid, isophthalic acid and terephthalic acid and the like. The dicarboxylic acids can be used both individually and in the form of a mixture. Instead of the free dicarboxylic acids, it is also possible to use the corresponding dicarboxylic acid derivatives, such as, for example, dicarboxylic acid monoesters and/or diesters of alcohols having from 1 to 6 carbon atoms, or dicarboxylic acid anhydrides. Preference is given to the use of dicarboxylic acid mixtures of succinic, glutaric and adipic acid in relative proportions of, for example, 20–35/35–50/20–32 parts by weight, and especially adipic acid. Examples of di- and poly-hydric alcohols are ethanediol, diethylene glycol, 1,2- and 1,3-propanediol, dipropylene glycol, methyl-1,3-propanediol, 1,4-butanediol, 1,3-butanediol, 1,5-pentanediol, 1,6-hexanediol, neopentyl glycol, 1,10-decanediol, glycerol, trimethylolpropane and pentaerythritol. Preference is given to the use of 1,2-ethanediol, diethylene glycol, 1,4-butanediol, 1,6-hexanediol, glycerol, trimethylolpropane or mixtures of at least two of the mentioned diols, especially mixtures of ethanediol, 1,4-butanediol and 1,6-hexanediol, glycerol and/or trimethylolpropane. It is also possible to use polyester polyols of lactones, for example ε-caprolactone, or hydroxycarboxylic acids, for example, O-hydroxycaproic acid and hydroxyacetic acid.

To prepare the polyester polyols, the organic (for example, aromatic and preferably aliphatic) polycarboxylic acids and/or polycarboxylic acid derivatives and the polyhydric alcohols can be subjected to polycondensation without a catalyst or in the presence of an esterification catalyst. Advantageously, this polycondensation is carried out in an atmosphere of inert gas, such as, for example, nitrogen, carbon monoxide, helium, argon, in solution or in the melt, at temperatures of from 150 to 300° C., preferably from 180 to 230° C., optionally under reduced pressure, until the desired acid number (advantageously less than 10, preferably less than 1) is reached.

According to a preferred preparation process, the esterification mixture is subjected to polycondensation at the above-mentioned temperatures to an acid number of from 80 to 30, preferably from 40 to 30, under normal pressure and then under a pressure of less than 500 mbar, preferably from 10 to 150 mbar. Examples of suitable esterification catalysts are iron, cadmium, cobalt, lead, zinc, antimony, magnesium, titanium and tin catalysts in the form of metals, metal oxides or metal salts. The polycondensation may, however, also be carried out in the liquid phase in the presence of diluents and/or entrainers, such as, for example, benzene, toluene, xylene or chlorobenzene, for the azeotropic distillation of the water of condensation.

In the preparation of the polyester polyols, the organic polycarboxylic acids and/or their derivatives are subjected to polycondensation with polyhydric alcohols advantageously in a molar ratio of 1:1 to 1.8, preferably 1:1.05 to 1.2. The resulting polyester polyols preferably have a functionality of from 1 to 3, more preferably from 1.8 to 2.4, and a number-average molecular weight of from 400 to 6000, preferably from 800 to 3500.

Suitable polyester polyols which may also be used are polycarbonates having hydroxyl groups. Suitable polycarbonates having hydroxyl groups include any of those known in the art which can be prepared, for example, by reaction of diols, such as 1,2-propanediol, 1,3-propanediol, 1,3-butanediol, 1,4-butanediol, 1,6-hexanediol, diethylene glycol, trioxyethylene glycol and/or tetraoxyethylene glycol, with dialkyl carbonates, diaryl carbonates, for example diphenyl carbonate or phosgene.

In the preparation of the polyurethanes according to the invention, polyester polyols having a functionality of two or more and a number-average molecular weight of from 500 to 6000, preferably from 800 to 3500-and most preferably from 1000 to 3300 are preferably used.

For the preparation of the polyurethanes according to the invention there may additionally be used as component b2)

low molecular weight difunctional chain extenders, tri- or tetra-functional crosslinkers, or mixtures of chain extenders and crosslinkers.

Chain extenders and crosslinkers b2) are used to modify the mechanical properties, especially the hardness, of the PU molded bodies. Suitable chain extenders include alkanediols, dialkylene glycols and polyalkylene polyols, and suitable crosslinkers include tri- or tetra-hydric alcohols and oligomeric polyalkylene polyols. The chain extender and/or crosslinker will generally have a functionality of from 3 to 4 and a molecular weight <600, preferably from 18 to 400 and most preferably from 60 to 300. Preferred chain extenders are alkanediols having from 2 to 12 carbon atoms, preferably 2, 4 or 6 carbon atoms, for example 1,3-butanediol, 1,6-hexanediol, 1,7-heptanediol, 1,8-octanediol, 1,9-nonanediol, 1,10-decanediol and especially ethanediol and 1,4-butanediol and dialkylene glycols having from 4 to 8 carbon atoms, for example diethylene glycol and dipropylene glycol, as well as polyoxyalkylene glycols. Also suitable are branched-chain and/or unsaturated alkanediols usually having not more than 12 carbon atoms, such as, for example, 1,2-propanediol, 2-methyl-1,3-propanediol, 2,2-dimethyl-1,3-propanediol, 2-butyl-2-ethyl-1,3-propanediol, 2-butene-1,4-diol and 2-butyne-1,4-diol; diesters of terephthalic acid with glycols having from 2 to 4 carbon atoms, such as, for example, terephthalic acid bis-ethylene glycol or terephthalic acid bis-1,4-butanediol; hydroxyalkylene ethers of hydroquinone or of resorcinol, for example 1,4-di-(β-hydroxyethyl)-hydroquinone or 1,3-(β-hydroxyethyl)-resorcinol; alkanolamines having from 2 to 12 carbon atoms, such as ethanolamine, 2-aminopropanol and 3-amino-2,2-dimethylpropanol; N-alkyl-dialkanolamines, for example N-methyl- and N-ethyl-diethanolamine; (cyclo)aliphatic diamines having from 2 to 15 carbon atoms, such as 1,2-ethylenediamine, 1,3-propylenediamine, 1,4-butylenediamine and 1,6-hexamethylenediamine, isophoronediamine, 1,4-cyclohexamethylenediamine and 4,4'-diamino-dicyclohexylmethane; and N-alkyl-substituted, N,N'-dialkyl-substituted and aromatic diamines, which may also be substituted on the aromatic radical by alkyl groups, having from 1 to 20 carbon atoms, preferably from 1 to 4 carbon atoms, in the N-alkyl radical, such as N,N'-diethyl-, N,N'-di-sec-pentyl-, N,N'-di-sec-hexyl-, N,N'-di-sec-decyl- and N,N'-dicyclohexyl-, (p- and m-)-phenylenediamine, N,N'-dimethyl-, N,N'-diethyl-, N,N'-diisopropyl-, N,N'-di-sec-butyl-, N,N'-dicyclohexyl-, 4,4'-diamino-diphenylmethane, N,N'-di-sec-butylbenzidine, methylene-bis(4-amino-3-benzoic acid methyl ester), 2,4-chloro-4,4'-diamino-diphenylmethane, 2,4- and 2,6-toluenediamine.

The compounds of component b2) can be used in the form of mixtures or individually. The use of mixtures of chain extenders and crosslinkers is also possible.

The hardness of the polyurethanes is obtained from the combination according to the invention of components a1) with b1) and b2) in relatively broad relative proportions, the hardness increasing as the content of components a1) and b2) in the reaction mixture rises.

As catalyst there may be used amine catalysts known to the person skilled in the art, for example tertiary amines, such as triethylamine, tributylamine, N-methyl-morpholine, N-ethyl-morpholine, N,N,N',N'-tetramethyl-ethylenediamine, pentamethyl-diethylenetriamine and higher homologues (DE-OS 26 24 527 and 26 24 528); 1,4-diazabicyclo-[2.2.2]-octane, N-methyl-N'-dimethylaminoethyl-piperazine, bis-(dimethylaminoalkyl)-piperazines, N,N-dimethylbenzylamine, N,N-dimethylcyclohexylamine, N,N-diethylbenzylamine, bis-(N,N-diethylaminoethyl) adipate, N,N,N',N'-tetramethyl-1,3-butanediamine, N,N-dimethyl-β-phenyl-ethyl-amine, bis-(dimethylaminopropyl)-urea, 1,2-dimethylimidazole, 2-methylimidazole, monocyclic and bicyclic amidines, bis-(dialkylamino)alkyl ethers, and also tertiary amines having amide groups (preferably formamide groups) according to DE-OS 25 23 633 and 27 32 292. Suitable catalysts are also the known Mannich bases of secondary amines, such as dimethylamine, and aldehydes, preferably formaldehyde, or ketones, such as acetone, methyl ethyl ketone or cyclohexanone, and phenols, such as phenol, nonylphenol or bisphenol. Tertiary amines, as catalyst, containing hydrogen atoms active towards isocyanate groups are, for example, triethanolamine, triisopropanolamine, N-methyl-diethanolamine, N-ethyl-diethanolamine, N,N-dimethyl-ethanolamine, reaction products thereof with alkylene oxides, such as propylene oxide and/or ethylene oxide, as well as secondary-tertiary amines according to DE-OS 27 32 292. It is also possible to use as catalysts silaamines having carbon-silicon bonds, as are described in U.S. Pat. No. 3,620,984, for example 2,2,4-trimethyl-2-silamorpholine and 1,3-diethyl-aminomethyl-tetramethyl-disiloxane. There come into consideration also nitrogen-containing bases, such as tetraalkylammonium hydroxides, and also hexahydrotriazines. The reaction between NCO groups and Zerewitinoff-active hydrogen atoms is also greatly accelerated by lactams and azalactams. According to the invention, the concomitant use of organic metal compounds, especially organic tin compounds, as additional catalysts is also possible. Suitable organic tin compounds, in addition to sulfur-containing compounds, such as di-n-octyl-tin mercaptide, are preferably tin(II) salts of carboxylic acids, such as tin(II) acetate, tin(II) octoate, tin(II) ethylhexoate and tin(II) laurate, and tin(IV) compounds, for example dibutyltin oxide, dibutyltin dichloride, dibutyltin diacetate, dibutyltin dilaurate, dibutyltin maleate or dioctyltin diacetate.

The catalysts or catalyst combinations are generally used in an amount of approximately from 0.001 to 10 wt. %, especially from 0.05 to 2 wt. %, based on the total amount of compounds having at least two hydrogen atoms reactive towards isocyanates.

Component c) (polymer modifier) is a graft rubber composed of a rubber polymer having a glass transition temperature below 0° C. and a polymer grafted at least partially onto the rubber and having at least one vinyl monomer or acrylic monomer. The graft rubbers which are suitable as polymer modifiers c) preferably have a particulate structure with mean particle diameters ($d_{50}$ value) of from 0.1 to 0.8 μm and are used in the form of appropriate powders or alternatively in coarse-grained form, i.e. in the form of agglomerates of such particles. The graft rubbers are composed of from 20 to 80 wt. %, preferably from 30 to 75 wt. %, of a rubber having the mentioned glass transition temperature and the remainder of the graft rubber is a grafted-on vinyl monomer and/or acrylic monomer.

The following rubbers, for example, are suitable for the preparation of the graft rubbers: diene monomer rubbers based on butadiene, isoprene, chloroprene, optionally in admixture with up to 35 wt. % of other monomers, such as styrene, acrylonitrile or alkyl methacrylate, olefin rubbers based on ethylene, propylene, isobutylene, vinyl acetate, alkyl acrylate and small amounts of diene monomer, or alkyl acrylate rubbers based on alkyl acrylate monomers (especially $C_1$–$C_7$-alkyl acrylate), optionally in admixture with up to 10 wt. % of other vinyl monomers or alkyl monomers and suitable crosslinkers. Particularly preferred graft rubbers are produced by free-radical grafting of vinyl monomers onto rubber polymer present in at least partially crosslinked form. The rubber used preferably has a gel content of at least 30 wt. %.

Suitable vinyl monomers for grafting on to the rubber are, for example, monomers such as styrene, p-methylstyrene, α-methylstyrene, acrylonitrile, methacrylonitrile, C1–6-alkyl methacrylate, vinyl acetate, vinyl ethers, maleic anhydride and maleic acid imides, methacrylamides and mixtures of such monomers. Particularly suitable graft monomers are styrene-acrylonitrile combinations or combinations containing methyl methacrylate.

The preparation of the graft polymers suitable as component c) is preferably carried out by means of known free-radical emulsion graft polymerization.

The graft reaction, the emulsion polymerization and the mass polymerization are described in detail in Ullmann Enzyklopädie, 4th edition, Volume 19, pages 277–295.

Graft products within the scope of the present invention are polymers produced by polymerization of vinyl monomers and/or of acrylic monomers in the presence of one or more different rubbers. In that so-called grafting reaction, genuine graft products are formed, besides ungrafted portions of the vinyl/acrylic polymer. Within the scope of the invention, graft rubber is to be understood as being especially intimate mixtures of those two components.

Component c) is preferably used in an amount of from 1 to 30 wt. %, preferably from 3 to 20 wt. %, based on the total amount of modified polyurethane.

When the graft polymers are added as component c) to the polyisocyanates a1) there are formed isocyanate components in which the polymer modifiers c) are present in swelled and dispersed form. The degree of swelling of the polymer modifiers c) present in dispersed form in component a1) is generally from 2 to 6. The determination of the degree of swelling serves to characterize the interaction of polymers with swelling agents. The methods of determination are described in Hoffmann, Martin Polymeranalytik I and II (1977) ISBN 3-13-5-19701-8, ISBN 3-13-5-19801-4.

As fillers d), fillers that dissolve in pickling solutions used in the electroplating of plastics, for example those based on dilute or concentrated inorganic acids or mixtures, for example sulfuric acid, chromosulfuric acid, hydrochloric acid and/or phosphoric acid; alkali or alkaline earth halides; sulfates; carbonates; sugars and the like are preferably used. Preference is given to the use of alkaline earth carbonates, such as, for example, chalks, calcite or aragonite, in the form of powders having a mean particle size of from 0.02 to 0.5 μm, preferably from 0.1 to 0.3 μm. The bulk density is preferably from 170 to 500 kg/m³. The filler d) can be added either to component b1) or to component a1) during the production of the molded bodies, but it is preferably added to b1). The component to which the filler d) is added should be stirred during processing in order to prevent sedimentation.

Component d) is preferably used in an amount of from 1 to 30 wt. %, preferably from 3 to 20 wt. %, based on the total amount of modified polyurethane.

The invention is to be illustrated further by means of the following Examples.

In the following Examples, amounts relate to parts by weight of the components.

EXAMPLES

TABLE 1

Composition of the modified polyurethanes

| Component | Example 1 | Example 2 | Example 3 | Example 4* | Example 5* |
|---|---|---|---|---|---|
| Polyol 1 | | | | | 71.5 |
| Polyol 2 | 35.68 | 29.97 | 43.34 | 36.4 | |
| Polyol 3 | 23.78 | 19.98 | | | |
| Calcium carbonate | | 16.0 | | 16.0 | 18.0 |
| Ethanediol | | | | | 26.3 |
| Silicone stabilizer*¹ | | | | | 1.4 |
| Dabco ® 33LV*² | | | | | 0.7 |
| Dibutyltin dilaurate | | | | | 0.1 |
| Isocyanate 1 | 40.54 | 34.06 | | | |
| Isocyanate 2 | | | 56.66 | 47.6 | |
| Isocyanate 3 | | | | | 142 |

*according to the invention
*¹Product from Goldschmidt sold under the designation B 8411.
*²Product from Air Products: 33% solution of diazabicyclooctane Polyol 1: Polyether polyol of OH number 28 prepared by addition of propylene oxide and ethylene oxide (80:20%) to trimethylolpropane as starter with 90% primary OH groups.

Polyol 2: Polyether polyol of OH number 385 produced by addition of propylene oxide to trimethylolpropane as starter.

Polyol 3: Polyether polyol of OH number 35 produced by addition of propylene oxide and then ethylene oxide (84.9:13.1) to trimethylolpropane as starter with approximately 77% primary OH groups.

Calcium carbonate: Bulk density of approximately 250 kg/m³ and a mean particle diameter of 0.3 μm Isocyanate 1: 70.0% of a polymeric isocyanate of the diphenylmethane group having an NCO content of approximately 31.5% was mixed at room temperature with 30.0% of a polymeric isocyanate of the diphenylmethane group having a NCO content of approximately 32.6%.

Isocyanate 2: 800 parts of a polymeric isocyanate of the diphenylmethane group having a NCO content of 32.6% were placed in a stirring apparatus and heated to 80° C. under nitrogen. There were then introduced in portions, over a period of 2 hours, 200 parts of a dry acrylonitrile-butadiene-styrene graft polymer with a core of crosslinked butadiene rubber having a mean particle size of 0.4 μm and a graft shell of styrene and acrylonitrile. After a stirring time of 4 hours, the homogeneous dispersion was filtered over a 200 μm filter cloth. NCO content: 26.0%; viscosity at 25° C.: 4500 mPa·s Isocyanate 3: 850 parts of a carbodiimide-modified 4,4'-diphenylmethane diisocyanate having an NCO value of approximately 30% were placed in a stirring apparatus and heated to 80° C. under nitrogen. There were then introduced in portions, over a period of 2 hours, 150 parts of a dry acrylonitrile-butadiene-styrene graft copolymer composed of a core of crosslinked butadiene rubber having a mean particle size of 0.4 μm with a graft shell of styrene and acrylonitrile. After a stirring time of 4 hours, the homogeneous dispersion was filtered over a 200 μm filter cloth. NCO content: 24.5%; viscosity at 25° C.: 630 mPa·s Preparation of the Polyurethanes

Example 1

Preparation of the Polyurethane without Filler and without Polymer Modifier 35.68 parts of Polyol 2 were mixed with 23.78 parts of Polyol 3 and dehydrated for approximately 1 hour at 80° C./<5 mbar in a flat-bottomed beaker stirring apparatus. The mixture was then cooled to approximately 30° C. 40.54 parts of Isocyanate 1 were added to the polyol mixture and homogenization was carried out in vacuo (<5 mbar/at least 5 min) until the components were fully compatible. A period of 10 minutes was then allowed to elapse, until the remaining air bubbles could rise to the surface.

The reaction mixture was then poured into a mold and cured for 24 hours at 80° C.

Example 2

Preparation of the Polyurethane with Filler (Chalk)

29.97 parts of Polyol 2 were mixed at room temperature with 19.98 parts of Polyol 3.16 parts of $CaCO_3$ (Kremer-Pigmente, grain size 1 μ) were added thereto, and dispersion was carried out for approximately 10 minutes using a mixer (Ultra-Turrax). The dispersion was then dehydrated for 1 hour at 80° C./<5 mbar in a flat-bottomed beaker.

The mixture was then cooled to approximately 30° C., and 34.06 parts of Isocyanate 1 were added thereto, and the mixture was homogenized in vacuo (<5 mbar/at least 5 min) until full compatibility of the components had been achieved. A period of 10 minutes was then allowed to elapse, until the remaining air bubbles could rise to the surface.

The reaction mixture was then poured into a mold and cured for 24 hours at 80° C.

Example 3

Preparation of the Polyurethane with Polymer Modifier (ABS)

43.34 parts of Polyol 2 were placed in a flat-bottomed beaker stirring apparatus and dehydrated for approximately 1 hour at 80° C./<5 mbar. The mixture was then cooled to approximately 30° C., 56.66 parts of Isocyanate 2 were added thereto, and homogenization was carried out in vacuo (<5 mbar/at least 5 min) until full, compatibility of the components had been achieved. A period of 10 minutes was then allowed to elapse, until the remaining air bubbles could rise to the surface.

The reaction mixture was then poured into a mold and cured for 24 hours at 80° C.

Example 4

Preparation of the Polyurethane with ABS and Chalk 36.40 parts of Polyol 2 were mixed with 16 parts of $CaCO_3$ (Kremer-Pigmente, grain size 1 μm) and homogenized for approximately 10 minutes using an Ultra-Turrax. The mixture was then transferred to a flat-bottomed beaker stirring apparatus and dehydrated for 1 hour at 80° C./<5 mbar. The mixture was then cooled to approximately 30° C., 47.60 parts of Isocyanate 2 were added thereto, and the mixture was homogenized in vacuo (<5 mbar/at least 5 min) until full compatibility of the components had been achieved. A period of 10 minutes was then allowed to elapse, until the remaining air bubbles could rise to the surface.

The reaction mixture was then poured into a mold and cured for 24 hours at 80° C.

Example 5

Preparation of the Polyurethane with ABS and Chalk by the RIM Process 71.5 parts by weight of Polyol 1 were placed in a vessel, and the other constituents mentioned in the table (column 5) (except for Isocyanate 3) were added in succession, with constant stirring. The homogeneous polyol formulation was reacted in a high-pressure installation with Isocyanate 3, in the indicated relative proportions (118 parts by weight of polyol formulation: 142 parts by weight of Isocyanate 3), to form moldings having a density of approximately 1100 $kg/m^3$.

The electroplating tests carried out on the molded bodies showed that the molded bodies of Examples 1 to 3 could not be electroplated with good adhesion. By contrast, the molded bodies of Examples 4 and 5 could be metallized with good adhesion by the plastics electroplating process.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A modified polyurethane comprising
    i) at least one polyurethane obtained from an organic polyisocyanate, polyol and, optionally, chain extender and/or crosslinker,
    ii) at least one polymer modifier composed of at least one swellable graft rubber having a particulate structure which is dispersible in an organic polyisocyanate comprising from 20 to 80 wt. % of a rubber polymer having a glass transition temperature below 0° C. with the remainder being a grafted-on vinyl monomer and/or acrylic monomer,
    iii) at least one filler which is soluble in a pickling solution for electroplating of plastics and has a mean particle size of from 0.02 to 0.5 μm and a bulk density of from 170 to 500 $kg/m^3$, and
    iv) optionally, one or more other conventional auxiliaries, additives and/or catalysts.
2. A process for the production of a modified polyurethane comprising reacting
    a) a polyisocyanate component comprising
        a1) at least one optionally modified organic polyisocyanate having an NCO content of from 5 to 50 wt. %,
        a2) optionally, conventional auxiliary substances and additives, with
    b) a polyol component comprising
        b1) at least one long-chain polyether, polyether amine or polyester having an OH functionality of from 2 to 6 and a number-average molecular weight of from 1000 to 12,000 g/mol (daltons), 2) optionally, a short-chain polyol or polyamine having an OH or NH functionality of from 2 to 6 and a molecular weight of from 60 to 600, and
3) optionally, auxiliary substances and/or additives which are different from b1) and b2), c) at least one polymer modifier comprising at least one swellable graft rubber having a particulate structure which is dispersible in component a1) which is composed of from 20 to 80 wt. % of a rubber polymer having a glass transition temperature below 0° C. and the remainder a grafted-on vinyl monomer and/or acrylic monomer, and d) at least one filler which is soluble in a pickling solution for electroplating of plastics and has a mean particle size of from 0.02 to 0.5 μm and a bulk density of from 170 to 500 kg/m$^3$, optionally, in the presence of a catalyst.

3. The process of claim 2 in which a1) has an NCO content of from 15 to 48 wt. %.

4. An electroplated or metallized molded article produced from the modified polyurethane of claim 1.

* * * * *